United States Patent
Okuyama et al.

(10) Patent No.: US 6,687,072 B2
(45) Date of Patent: Feb. 3, 2004

(54) DISK APPARATUS AND INFORMATION PROCESSING SYSTEM DISCRIMINATIVE PLURAL EXTERNAL ELECTRONIC APPLIANCES

(75) Inventors: Atsushi Okuyama, Chiyoda (JP); Kyo Akagi, Fuchu (JP); Takashi Yamaguchi, Tsuchiura (JP); Motoyasu Tsunoda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 326 days.

(21) Appl. No.: 09/801,846

(22) Filed: Mar. 9, 2001

(65) Prior Publication Data

US 2002/0126408 A1 Sep. 12, 2002

(51) Int. Cl.[7] .................................................. G11B 5/02
(52) U.S. Cl. ............................ 360/55; 360/69; 360/46
(58) Field of Search ............................... 386/113, 116, 386/106, 102; 710/74, 73, 72, 11, 13, 15, 17, 18; 360/55, 48, 61, 69, 31, 46, 65, 67, 75, 73.03, 60

(56) References Cited

U.S. PATENT DOCUMENTS 4,446,488 A * 5/1984 Suzuki ........................ 386/97
4,689,698 A * 8/1987 Ishikawa et al. ............... 360/69
6,295,564 B1 * 9/2001 Shigetomi et al. ............ 710/74

FOREIGN PATENT DOCUMENTS

| JP | 08234924 A1 | * | 9/1996 | .................. 360/55 |
| JP | 10222310 A1 | * | 8/1998 | .................. 360/55 |

* cited by examiner

Primary Examiner—Alan T. Faber
(74) Attorney, Agent, or Firm—Antonelli, Terry, Stout & Kraus, LLP

(57) ABSTRACT

A magnetic disk apparatus includes a requesting unit for requesting the magnetic disk apparatus to re-set a value of specification information capable of determining performance of the magnetic disk apparatus in combination with either identification result or flag information; a performance unit for causing the magnetic disk apparatus which receives the request to re-set the own specification; a detecting unit for detecting an internal condition of the disk apparatus; a processing unit for processing the detection result; a conversion unit for converting the internal condition of the magnetic disk apparatus into states of a numeral value, a figure, a color, and a sound in combination with the process result, and for notifying the converted condition to a user; and a battery.

12 Claims, 15 Drawing Sheets

FIG. 6

| EXTERNAL ELECTRONIC APPLIANCE | IDENTIFICATION INFORMATION |
|---|---|
| PERSONAL COMPUTER | 00h |
| MUSIC SERVER | 01h |
| VIDEO RECORDER | 02h |
| PORTABLE INFORMATION TERMINAL | 03h |
| CAR NAVIGATION SYSTEM | 04h |

FIG. 9

| PERFORMANCE PARAMETER | INITIAL VALUE | SETTABLE RANGE |
|---|---|---|
| SEEK MODE | 1 | 0:LOW SPEED MODE<br>1:HIGH SPEED MODE |
| TRANSFER SPEED | 66MB/s | 18/33/66 |
| SPINDLE ROTATION SPEED | 4200rpm | 2100/3150/4200 |
| CACHE SIZE | 4.0MB | 1.0/2.0/4.0 |
| ECC LENGTH | 40B | 10/20/30/40 |

FIG. 10

| OPERATION MODE | PERFORMANCE PARAMETER | SETTING EXAMPLE |
| --- | --- | --- |
| HIGH PERFORMANCE MODE | SEEK MODE | 1 |
| | TRANSFER SPEED | 66 |
| | SPINDLE ROTATION SPEED | 4200 |
| | CACHE SIZE | 4.0 |
| | ECC LENGTH | 40 |
| LOW NOISE MODE | SEEK MODE | 0 |
| | TRANSFER SPEED | 18 |
| | SPINDLE ROTATION SPEED | 2100 |
| | CACHE SIZE | 4.0 |
| | ECC LENGTH | 40 |
| MOVING PICTURE REPRODUCTION MODE | SEEK MODE | 1 |
| | TRANSFER SPEED | 66 |
| | SPINDLE ROTATION SPEED | 3150 |
| | CACHE SIZE | 4.0 |
| | ECC LENGTH | 40 |
| HIGH RELIABLE MODE | SEEK MODE | 0 |
| | TRANSFER SPEED | 18 |
| | SPINDLE ROTATION SPEED | 2100 |
| | CACHE SIZE | 1.0 |
| | ECC LENGTH | 40 |

FIG. 11

| PERFORMANCE PARAMETER | INITIAL VALUE | SETTABLE RANGE |
|---|---|---|
| SEEK TRAJECTORY | 0 | 0 : HIGH SPEED TRAJECTORY<br>1 : LOW NOISE TRAJECTORY |
| SEEK METHOD | 0 | 0 : DIRECT SEEK<br>1 : INTERMITTENT SEEK |
| SERVO GAIN | 0 | 0 : NORMAL GAIN<br>1 : HIGH GAIN<br>2 : LOW GAIN |
| NOTCH FILTER | 0 | 0 : USE NOTCH FILTER<br>1 : NO-USE NOTCH FILTER |
| EXTERNAL SENSOR | 1 | 0 : USE EXTERNAL SENSOR<br>1 : NO-USE EXTERNAL SENSOR |

FIG. 12

| REQUIRED ITEM OF EXTERNAL ELECTRONIC APPLIANCE | PERFORMANCE PARAMETER | SETTING EXAMPLE | EXAMPLE OF EXTERNAL ELECTRONIC APPLIANCE |
|---|---|---|---|
| HIGH SPEED CHARACTERISTIC | SEEK TRAJECTORY | 0 | PERSONAL COMPUTER |
| | SEEK METHOD | 0 | |
| | SERVO GAIN | 0 | |
| | NOTCH FILTER | 0 | |
| | EXTERNAL SENSOR | 1 | |
| LOW NOISE CHARACTERISTIC | SEEK TRAJECTORY | 1 | MUSIC SERVER VIDEO SERVER |
| | SEEK METHOD | 0 | |
| | SERVO GAIN | 0 | |
| | NOTCH FILTER | 0 | |
| | EXTERNAL SENSOR | 1 | |
| LOW POWER CONSUMPTION | SEEK TRAJECTORY | 1 | PORTABLE INFORMATION TERMINAL |
| | SEEK METHOD | 1 | |
| | SERVO GAIN | 0 | |
| | NOTCH FILTER | 0 | |
| | EXTERNAL SENSOR | 0 | |
| SHOCK RESISTANCE CHARACTERISTIC | SEEK TRAJECTORY | 0 | CAR NAVIGATION SYSTEM |
| | SEEK METHOD | 0 | |
| | SERVO GAIN | 1 | |
| | NOTCH FILTER | 0 | |
| | EXTERNAL SENSOR | 0 | |

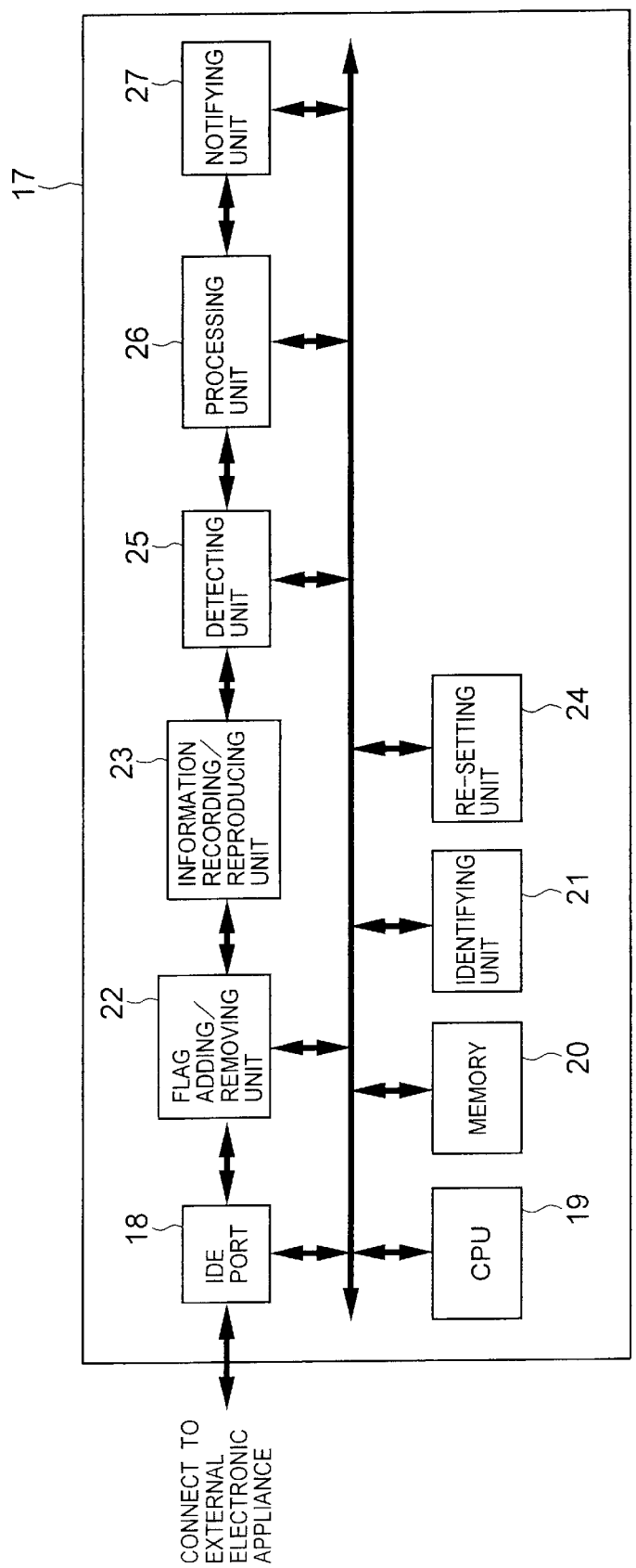

DISK APPARATUS AND INFORMATION PROCESSING SYSTEM DISCRIMINATIVE PLURAL EXTERNAL ELECTRONIC APPLIANCES

BACKGROUND OF THE INVENTION

The present invention relates to a magnetic disk apparatus, and more specifically, to a removable type magnetic disk apparatus.

Conventionally, as usage of magnetic disk apparatus, major magnetic disk apparatus are fixed inside personal computers to record/reproduce data on/from magnetic disks. Also, while conventional magnetic disk apparatus are made of removable (portable) type detachable constructions, these magnetic disk apparatus are used in such systems capable of recording/reproducing data such as moving pictures and voice, for instance, in a music server, a video recorder, a portable information terminal, a car navigation system.

On the other hand, such data as moving pictures and voice (speech) are necessarily required to be processed in a real-time mode. In other words, band guarantees of data transfer operations are necessarily required. To this end, JP-A-10-222310 describes the following idea. That is, in response to the request for the prediction of input/output execution time with respect to the command issued from the external electronic appliance to the disk apparatus, the disk apparatus predicts the execution time required to process this command. When the predicted time result is located within the maximum allowable time required by the external electronic appliance, the magnetic disk apparatus executes this command. When the predicted time result exceeds the maximum allowable time, the magnetic disk apparatus stops the execution of this command, and notifies this fact to the external electronic appliance.

Also, in a detachable removable type magnetic disk apparatus, such a problem may be conceived. That is, the trouble occurrence rate of the magnetic disk apparatus is increased which is caused by that when this magnetic disk apparatus is removed from the external electronic appliance, this magnetic disk apparatus is dropped. To avoid such a problem, JP-A-8-234924 discloses the following idea. While the disk write data is written into the disk and also the data which is substantially identical to the disk write data is stored in the non-volatile memory, the data stored in the non-volatile memory should be saved even after the data has been written in the disk under normal condition until the release command is issued from the upper grade apparatus, namely is used as the back-up for the disk write data. As explained above, since the back-up data is saved, the disk write data can be restored even when the disk not-readable problem happens to occur after the data has been written into the disk under normal condition.

In the above-described JP-A-10-222310, the band guarantee of the data transfer operation is directed to the major subject, which may become advantage when the external electronic appliance executes the real-time process operation. However, the disk apparatus itself merely predict the command execution time based upon the internal condition, but the disk apparatus is not always operated in the optimum condition on the system.

For example, in the case that the external electronic appliance corresponds to a music server and/or a video recorder, as the device use environment, normal home living rooms are conceivable. As a consequence, while the spindle rotation speed is lowered, the user requests to reduce noise sounds originated from this disk apparatus.

Furthermore, in such a disk apparatus which is accessed by a plurality of external electronic appliances, this disk apparatus owns such a function with respect to a command issued from each of these external electronic appliances. That is, this disk apparatus judges as to whether or not the received command can be executed within allowable time, and also notifies the judgement result to the external electronic appliance. Similar to a single set of external electronic appliance, this disk apparatus is not always operated in the optimum condition in the system.

Also, the above-described JP-A-8-234924 is directed to the data restore operation when the magnetic disk apparatus is mounted to the external electronic appliance. To this end, this disclosed idea owns the merit as follows. That is, the data is restored in such a case that the data is written by employing such a troubled disk apparatus while the disk apparatus is removed from the system. However, in view of the data protection, this disclosed idea does not always constitute the basic solving idea. For example, in the case that while a disk apparatus is used under single state, a disk problem happens to occur due to drop trouble, the internal condition of this disk apparatus would be brought into such a difficulty that although the data cannot be written into the disk apparatus, the data can be read therefrom. In such a trouble case, the disk apparatus must notify the internal condition to the user, and requests the user to back-up the data to another disk apparatus.

SUMMARY OF THE INVENTION

An object of the present invention is to provide such an apparatus operable under optimum condition in correspondence with a plurality of external electronic appliances mounted on this apparatus since a magnetic disk apparatus is additionally provided with such a function capable of discriminating the plural external electronic appliances mounted thereon.

Furthermore, another object of the present invention is to provide a system capable of detecting an internal condition of a disk apparatus, involving an attribute of data written thereinto, and also capable of notifying the detected internal condition to a user.

To achieve the above-explained objects, a disk apparatus, according to an aspect of the present invention, is featured by comprising: a plurality of signal input terminals defined by different standards; a data converter for converting a signal entered from the input terminals into input data; an identifying unit for identifying a sort of the input signal; a flag adding unit for adding a flag to the data outputted from the data converter based upon the output of the identifying unit; a recording/reproducing head for recording/reproducing the signal to which the flag has been added; and a disk for recording thereon information.

Also, an information processing system, according to another aspect of the present invention, is featured by arranging a plurality of different sorts of information processing apparatus, and a disk apparatus. The disk apparatus is arranged by employing: an input/output unit for transmitting/receiving information used to identify an information processing device corresponding to a data transfer counter party of the disk apparatus; an identifying unit for identifying an information processing device based upon the identification information; a flag processing unit for adding/removing a flag-based upon identification information to a signal inputted into the disk apparatus; a head unit for recording/reproducing the signal to which the flag has been added; and a magnetic disk for recording information.

Also, the disk apparatus is featured by further comprising: a condition detecting unit for detecting an internal condition of the disk apparatus; a processing unit for processing the output of the detecting unit; and a notifying unit for converting the internal condition of the disk apparatus into a signal of a numeral value, a figure, a color, and a sound in combination with the output of the processing unit, and for notifying the converted internal condition to a user.

BRIEF DESCRIPTION OF THE DRAWINGS

A more better understanding of the present invention may be made by reading a detailed description in conjunction with the accompanying drawings, in which:

FIG. 6 represents an example of the identification information;

FIG. 9 shows an example of the performance parameter;

FIG. 10 indicates an example of an operation mode;

FIG. 11 shows an example of the performance parameter;

FIG. 12 indicates an example of an operation mode;

FIG. 13 is a structural diagram for indicating a magnetic disk apparatus according to a fourth embodiment of the present invention;

DETAILED DESCRIPTION OF THE EMBODIMENTS

Referring now to drawings, a description will be made of various embodiments of the present invention.

Figure 1:
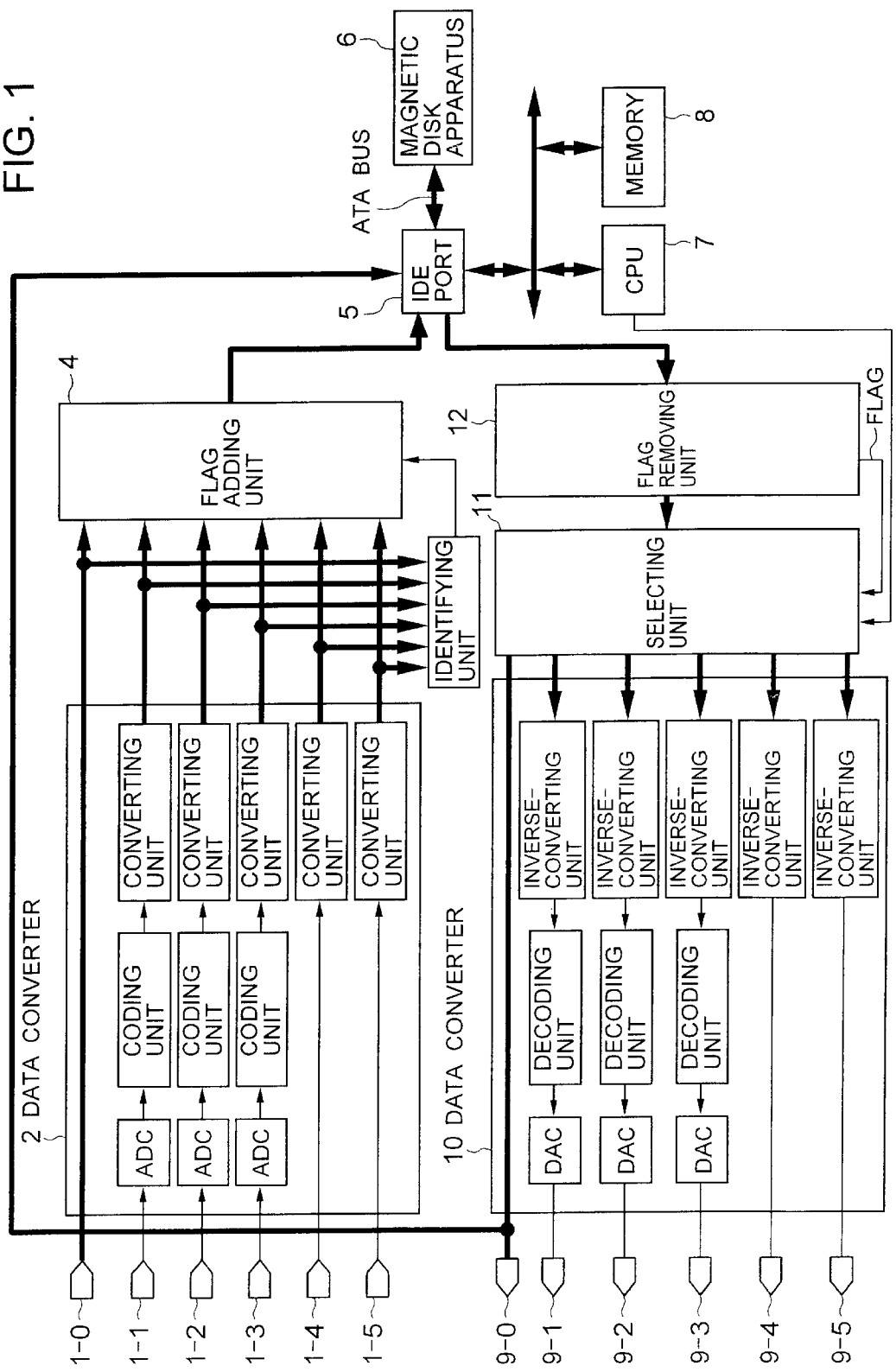
FIG. 1 is a structural diagram of an information processing system according to a first embodiment of the present invention.

FIG. 1 is a structural diagram of an information processing system according to a first embodiment of the present invention. It should be noted that an information processing apparatus to be connected to this information processing system is not shown in this drawing. In this drawing, both a disk apparatus 6 and a converting apparatus (converter apparatus) are represented. This converter apparatus converts signals used to connect plural information processing apparatus to each other.

The converter apparatus is equipped with a plurality of input terminals 1-0 to 1-5. The input terminal 1-0 corresponds to an IDE (Integrated Drive Electronics) terminal, the input terminal 1-1 corresponds to an analog picture signal terminal, the input terminal 1-2 corresponds to an analog audio (speech) signal (right) terminal, the input terminal 1-3 corresponds to an analog audio (speech) signal (left) terminal, the input terminal 1-4 corresponds to a digital video signal terminal, and the input terminal 1-5 corresponds to a digital audio signal terminal. A signal entered from an input terminal is sent to a data converter 2. A signal processed by the data converter 2 is supplied to both a identifying unit 3 and a flag adding unit 4. The output of the flag adding unit 4 is entered into an IDE port 5. The output of the IDE port 5 is sent to a head unit and a magnetic disk apparatus 6 constructed of a magnetic disk. The head unit records reproduces the output of the IDE port 5. A control unit is arranged by a CPU 7 and a memory 8.

Furthermore, this converter apparatus is provided with a plurality of output terminals. In this first embodiment, the respective output terminals are provided in correspondence with the previously described input terminals. In other words, this converter apparatus is equipped with an IDE output terminal 9-0, an analog picture signal output terminal 9-1, an analog audio signal (right) output terminal 9-2, an analog audio signal (left) output terminal 9-3, a digital video signal output terminal 9-4, and a digital audio signal output terminal 9-5. The output from the IDE port 5 is entered from a flag removing unit 12 via a selecting unit 11 to a data converter 10. This output data is converted into an analog signal by the data converter 10, and then this analog signal is sent to a desirable output terminal.

In this embodiment, as an interface of the magnetic disk apparatus, the ATA (AT attachment) formed in the ANSI (American National Standards Institute) is expectedly employed. However, for instance, the SCSI (Small Computer System Interface), the IEEE 1394, the SSA (Serial Storage Architecture), Fiber Channel, and the like may be applied to this interface of the magnetic disk apparatus. Also, input/output devices such as a graphic controller, a network controller, and a floppy disk controller may be employed in a bus line connected to the CPU 7.

The IDE input terminal 1-0 corresponds to such an input terminal to which, for example, a personal computer and the like are connected, and also a 40-core cable defined based upon the ATA standard is connected. Among the ATA-standardized signals entered into the IDE input terminal 1-0, the signal line of the data bus is entered into the data converter 2, and the signal lines other than the data bus are entered into the IDE port 5. The analog picture signal input terminal 1-1 corresponds to such an input terminal to which, for instance, a video cassette recorder is connected, normally, a so-called "AV cable" is connected. An analog signal entered into the analog picture signal input terminal 1-1 is entered into the data converter 2, and then this analog signal is converted into a digital signal by an A/D converter (ADC). This digital signal is processed by a coding process operation, for example, the JPEG (Joint Photographic Experts Group) process and the MPEG (Moving Picture Coding Experts Group) process, and then, the coding-processed digital signal is converted into a data format defined by the ATA standard in a converting unit.

The analog audio signal input terminals 1-2 and 1-3 correspond to such input terminals to which, for instance, a CD radio cassette recorder and the like are connected, namely, so-called "AV cables" are connected. Analog signals entered to the analog audio signal input terminals 1-2 and 1-3 are inputted to the data converter 2, and then are converted into digital signals by the A/D converter (ADC). These converted digital signals are processed by the coding process operation such as the MP3 (MPEG Audio Layer-3) process, and then are converted into data formats defined by the ATA standard in the converting unit.

The digital video signal input terminal 1-4 corresponds to such an input terminal to which, for example, a digital video camera recorder and the like are connected, normally a so-called "DV cable" is connected. A digital signal entered into the digital video signal input terminal 1-4 is inputted to the data converter 2, and then converted into a data format defined by the ATA standard in the converting unit. The digital audio signal input terminal 1-5 corresponds to such an input terminal to which, for example, a mini-disk recorder and the like are connected, normally an optical cable is connected. A digital signal entered into the digital audio signal input terminal 1-5 is inputted to the data converter 2, and then converted into a data format defined by the ATA standard in the converting unit.

The output signals of the data converter 2 are inputted to both the identifying unit 3 and the flag adding unit 4. It should also be noted that in this embodiment, as the input terminals, the IDE input terminal, the analog picture signal input terminal, the analog audio signal input terminal, the digital video signal input terminal, and the digital audio signal input terminal are expectedly employed. Alternatively, input terminals defined by standards other than the above-explained standards may be additionally employed.

The identifying unit 3 acquires the signals derived from the data converter 2, and identifies that which input terminal is used among the input terminals 1-0 to 1-5 by checking as to whether or not a signal may be propagated through the respective signal lines, namely by checking a use condition of the relevant signal line. The identification of the use condition of the signal line may be performed as follows: That is, for example, since each of these signals is a digital signal, this identifying unit 3 detects such a fact that a signal level of a digital signal is changed from a low level to a high level, or from a high level to a low level, and then may judge that such a signal line where the signal level of the digital signal is changed is under use. To reduce an erroneous judgement caused by noise, the identifying unit 3 detects such a fact that a digital signal value is changed plural times which exceed a preselected time, and may judge as to whether or not the signal line is under use. Alternatively, the identifying unit 3 may identify the use condition of the signal line by executing other discriminating methods. An identification result as to a use condition of a signal line is outputted from the identifying unit 3 to the flag adding unit 4. For example, in the case that all of the signal lines are under non-use condition, "FFh" is outputted as the identification result to the flag adding unit 4. Also, in the case that the IDE input terminal 1-0 is under use, the identifying unit 3 outputs "00h" as the identification result to the flag adding unit 4. In such a case that the analog picture signal input terminal 1-1 is under use, the identifying unit 3 outputs "01h" as the identification result to the flag adding unit 4. Also, in the case that the analog audio signal (right) input terminal 1-2 is under use, the identifying unit 3 outputs "02h" as the identification result to the flag adding unit 4. In such a case that the analog audio signal (left) input terminal 1-3 is under use, the identifying unit 3 outputs "03h" as the identification result to the flag adding unit 4. Also, in the case that the digital video signal terminal 1-4 is under use, the identifying unit 3 outputs "04h" as the identification result to the flag adding unit 4. In such a case that the digital audio signal input terminal 1-5 is under use, the identifying unit 3 outputs "05h" as the identification result to the flag adding unit 4. It should also be noted that as this identification result, such data is preferably used which may be identified from the normal data.

Figure 2:
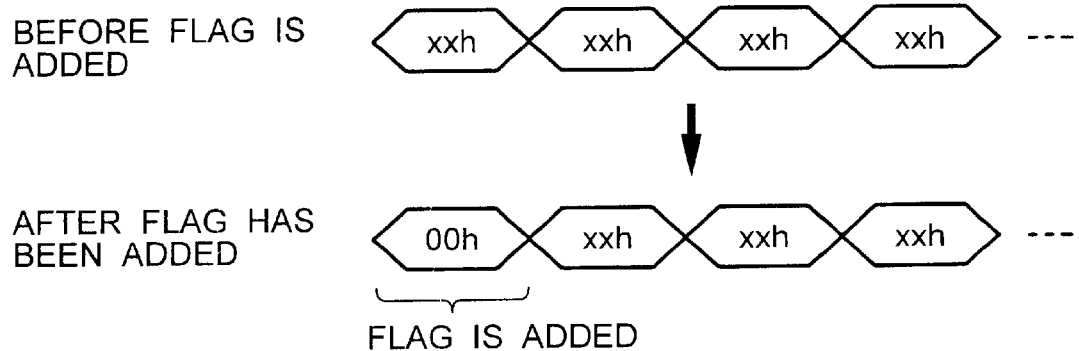
FIG. 2 illustratively shows an example of an adding procedure of flag information.

The flag adding unit 4 adds an identification result outputted from the identifying unit 3 as flag information to a data stream every, for example, a head of 8-bit data defined by the ATA standard, or every a predetermined interval thereof. FIG. 2 schematically shows an example of such a case that assuming now that the IDE input terminal 1-0 is used, "00h" is added to a head of a data stream as flag information.

The data stream into which the flag has been added is written into the magnetic disk apparatus 6. The data read/write control with respect to the magnetic disk apparatus 6 may be carried out in accordance with the ATA standard. The IDE port 5 contains an ATA controller (not shown).

The CPU 7 reads/writes an ATA register (not shown) of the magnetic disk apparatus 6 via this ATA controller. For example, when a PIO (Program I/O) transfer operation is performed, while either write data or read data is stored into the memory 8, the CPU 7 accesses the ATA register of the magnetic disk apparatus 6 via the IDE port 5, and judges as to whether or not the preparation of the data transfer operation is accomplished by observing the status of the ATA register. Then, the CPU 7 reads/writes the data from the memory 8 into the magnetic disk apparatus 6, and may repeatedly execute this data read/write operation plural times. The data stream containing the flag information, which is read out from the magnetic disk apparatus 6, is inputted into the flag removing unit 12. Alternatively, in the case that the IDE input terminal 1-0 is used, the data read/write control operation to the magnetic disk apparatus 6 may be carried out in response to the ATA-standardized signal.

The flag removing unit 12 removes the flag information from the data stream containing the flag information, which is read out from the magnetic disk apparatus 6, in accordance with a sequential operation which is opposite to that of the data converter 2. Both the removed flag information and such a data stream from which the flag information has been removed are entered into the selecting unit 11.

The selecting unit 11 selects such an output terminal from which the data read from the magnetic disk apparatus 6 is outputted based upon the removed flag information. In accordance with the rule determined by the identifying unit 3, the selecting unit 11 selects the IDE output terminal in such a case that the flag information corresponds to, for instance, "00h"; the selecting unit 11 selects analog picture signal output terminal in a case that the flag information corresponds to "01h"; the selecting unit 11 selects the analog audio signal (right) output terminal in such a case that the flag information corresponds to, for example, "02h"; the selecting unit 11 selects the analog audio signal (left) output terminal in such a case that the flag information corresponds to, for instance, "03h"; the selecting unit 11 selects the digital video signal output terminal in such a case that the flag information corresponds to, for example, "04h"; and also the selecting unit 11 selects the digital audio signal output terminal in such a case that the flag information corresponds to, for instance, "05h." Alternatively, in accordance with this embodiment, the selection of the output terminal by the selecting unit 11 may be carried out not only based upon the flag information, but also by a user via the CPU 7.

The data converter 10 converts the data format defined by the ATA standard into data formats suitable for the respective output terminals in accordance with a sequential operation which is opposite to that of the above-explained data converter 2, and outputs such data having the suitably-converted data format to the selected output terminal. When the IDE output terminal 9-0 is selected, a signal inputted into the data converter 10 is directly outputted from this IDE output terminal 9-0. When the analog picture signal output terminal 9-1 is selected, data is processed by an inverse-converting unit, a decoding unit, and a D/A converter (DAC) in accordance with a sequential operation which is opposite to that of the data converter 2.

In the case that both the analog audio signal output terminals 9-2 and 9-3 are selected, data is processed by the inverse-converting unit, the decoding unit, and the D/A converter (DAC) in accordance with the sequential operation which is opposite to that of the data converter 2. When the digital video signal output terminal 9-4 is selected, data is processed in the inverse-converting unit in accordance with the sequential operation which is opposite to that of the data converter 2. When the digital video signal output terminal 9-5 is selected, data is processed in the inverse-converting unit in accordance with the sequential operation which is opposite to that of the data converter 2.

Figure 3:
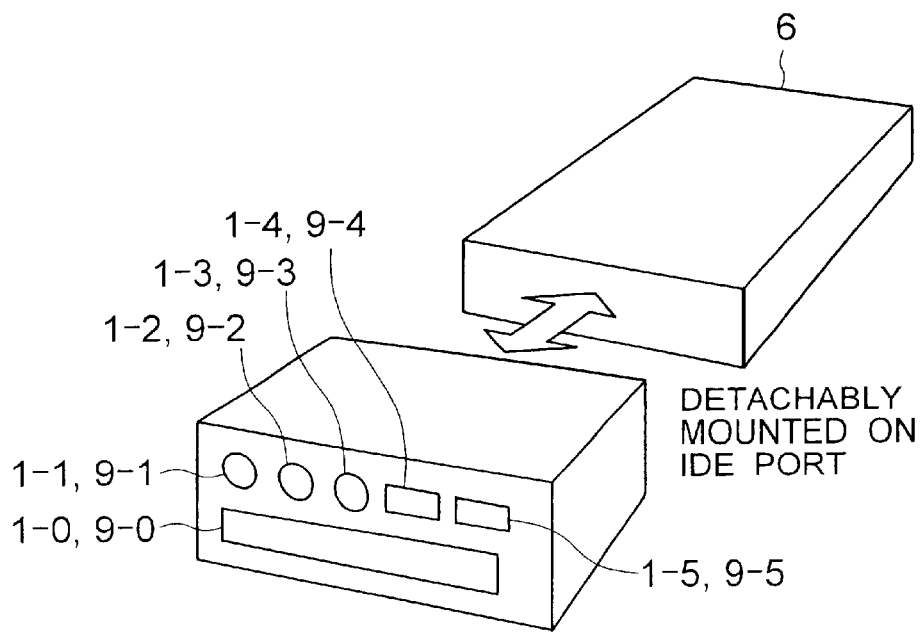
FIG. 3 is an example of an outer appearance view of a magnetic disk apparatus and a converter apparatus of the first embodiment of the present invention.

In this embodiment, the input terminals 1-0 to 1-5 may be combined with the output terminals 9-0 to 9-5 so as to constitute input/output terminals. FIG. 3 indicates an example of an outer appearance diagram as to the information processing system of the first embodiment of the present invention in such a case that the input terminals 1-0 to 1-5 are combined with the output terminals 9-0 to 9-5 so as to constitute input/output terminals. The magnetic disk apparatus 6 may be arranged by employing a detachable construction.

With employment of the above-explained, a plurality of external electronic appliances which are mounted on the input terminals can be identified from each other based up the flag information. Also, a plurality of input data defined by the different standards can be read/written from/into a single set of magnetic disk apparatus, while these input data are separated from each other with respect to each of connected electronic appliances. Furthermore, for instance, a data format of such data inputted as an analog audio signal is converted and may be outputted as a digital audio signal by properly selecting an output terminal by a user.

It should also be noted that this embodiment has described that the converter apparatus are separately provided with various sorts of information electronic appliances and the magnetic disk apparatus. Alternatively, the converter apparatus may be built in the magnetic disk apparatus. Also, the converter apparatus may be built in the information appliance.

Figure 4:
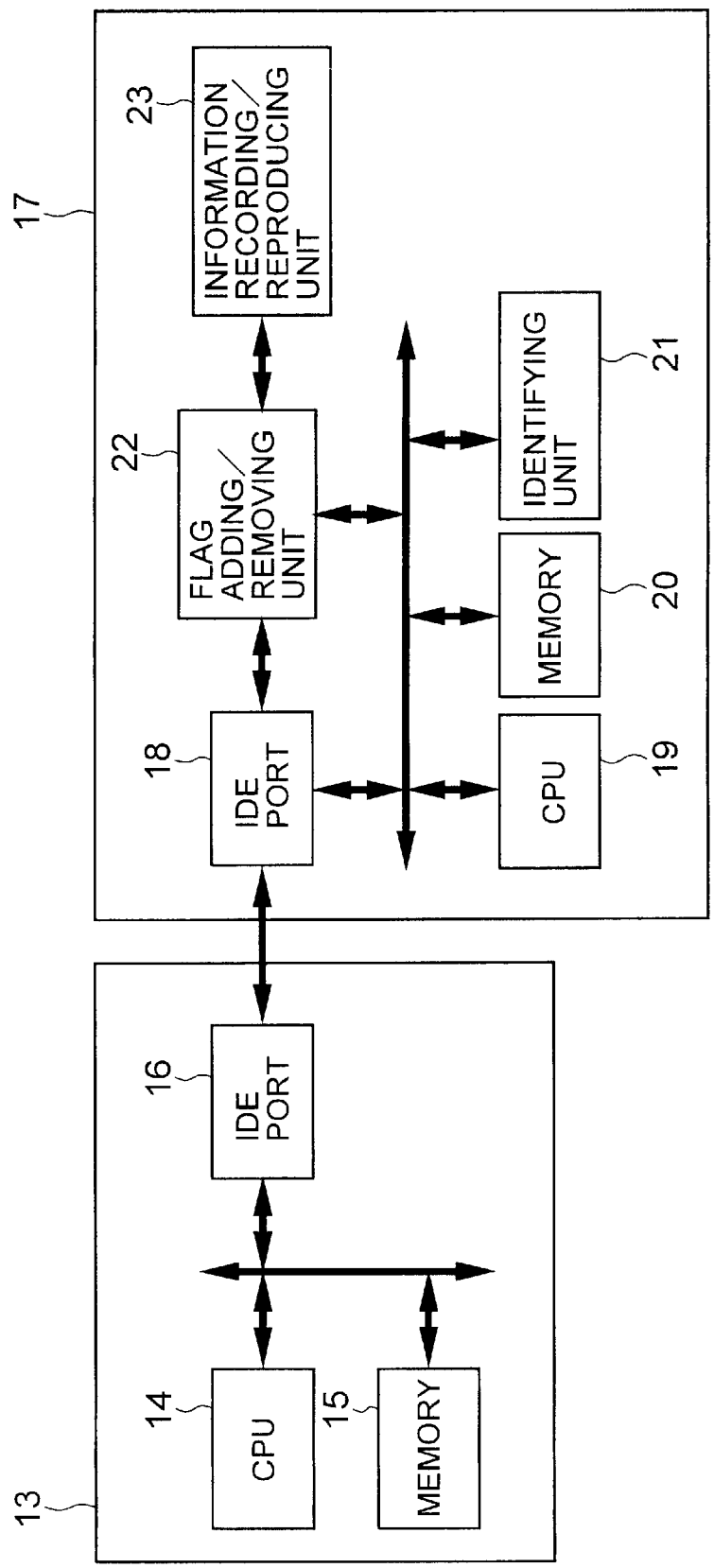
FIG. 4 is a block diagram of an information processing system according to a second embodiment of the present invention.

FIG. 4 is a block diagram for schematically indicating both a magnetic disk apparatus and an information processing system, according to a second embodiment of the present invention. This information processing system is constituted by an external information appliance 13 and a magnetic disk apparatus 6. The external information appliance 13 is arranged by a CPU 14, a memory 15, and an IDE port 16, which are connected to each other via a data bus. The magnetic disk apparatus 6 is equipped with an information recording/reproducing unit 23 which records thereon information, and is referred to as the conventional magnetic disk apparatus. The magnetic disk apparatus 17, according to this second embodiment, is provided with an IDE port 18, a CPU 19, a memory 20, an identifying unit 21, and a flag adding/removing unit 22 in addition to a recording/reproducing unit 23.

It should be understood that as the interface of the magnetic disk apparatus according to this second embodiment, the ATA is expectedly employed. Alternatively, other standardized interfaces may be used similar to the first embodiment. Also, various input/output devices such as a graphic controller, a network controller, and a floppy disk controller may be provided in a bus line connected to the CPU 14 and the CPU 19.

An external electronic appliance 13 corresponds to a personal computer, a music server, a video recorder, a portable information terminal, a car navigation system, and the like. Then, a data transfer operation between the memory 15 and the IDE port 16 is controlled by the CPU 14. The control operation of the data transfer executed between the memory 15 and the information recording/reproducing unit 23 may be carried out in accordance with the ATA standard. The IDE ports 16 and 18 each own an ATA controller (not shown). The CPUs 14 and 19 reads/writes an ATA register (not shown) of the information recording/reproducing unit 23 via the ATA controller. For example, in the case that the PIO transfer operation is carried out by the CPU 19, the CPU 19 accesses the ATA register of the magnetic disk apparatus 6 via the IDE port 18, and judges as to whether or not the preparation of the data transfer operation is accomplished by observing the status of the ATA register. Then, the CPU 19 reads/writes the data from the memory 15 into the information recording/reproducing unit 23, and may repeatedly execute this data read/write operation a plurality of plural times. The memory 20 may be used as a data buffer and the like in the data transfer operation.

Figure 5:
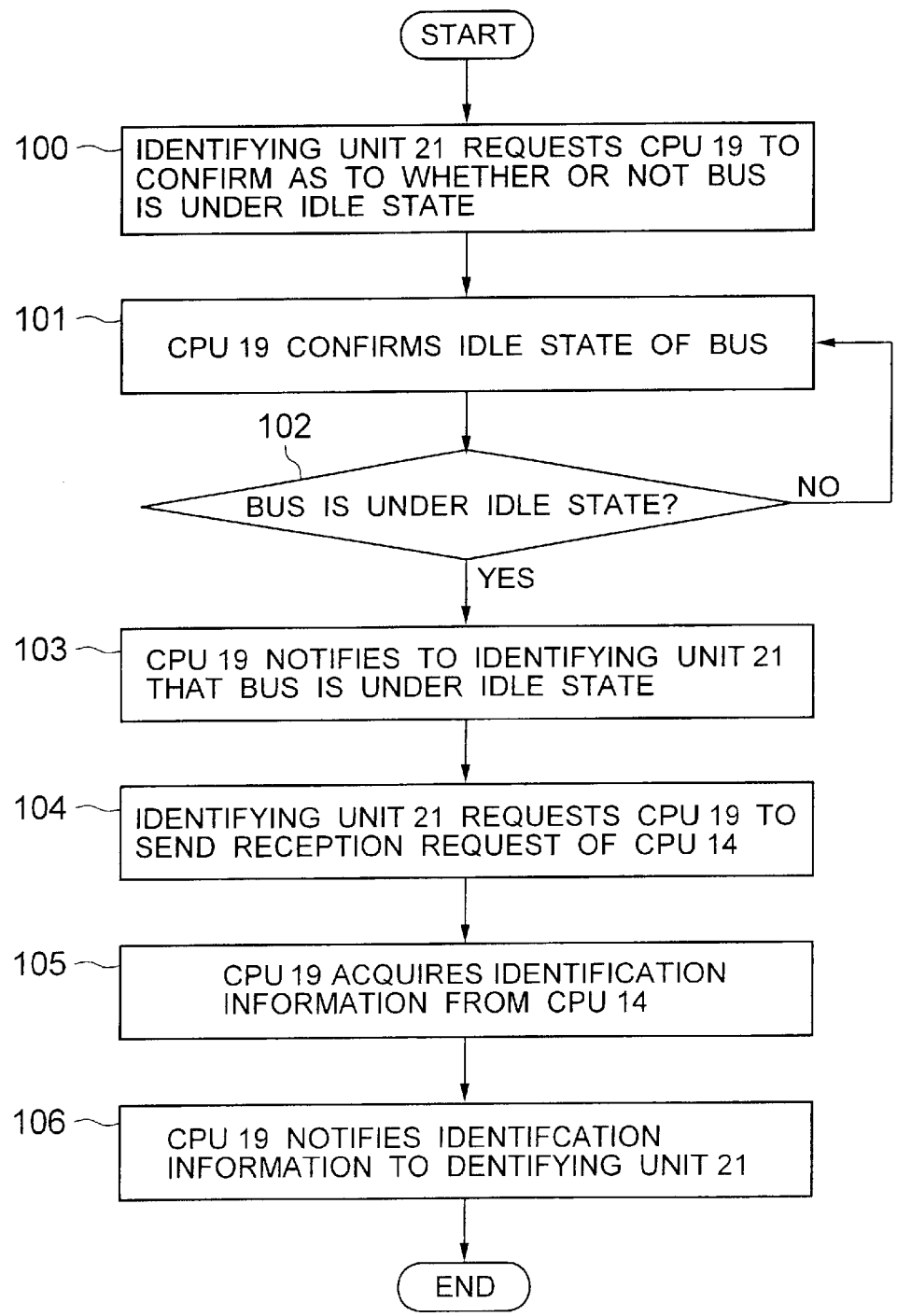
FIG. 5 is a flow chart for describing an acquisition process operation of identification information.

The identifying unit 21 acquires identification information indicative of a sort of an electronic appliance from the external electronic appliance 13. An acquisition process operation of such identification information will now be explained with reference to a flow chart of FIG. 5. The identifying unit 21 requests the CPU 19 to confirm as to whether or not the bus is brought into the idle state (step 100). Upon receipt of this request, the CPU 19 reads both a DRQ bit and a BSY bit of a Status register of the ATA register in order to confirm as to whether or not the bus is under idle state (step 101). At a further step 102, when both the DRQ bit and the BSY bit are equal to "0", respectively, the acquisition process operation is advanced to a step 103 while the CPU 19 confirms that the bus is under idle state. To the contrary, if not, then the acquisition process operation is returned to the previous step 101. When the bus is under idle state, the CPU 19 notifies this idle state to the identifying unit 21 (step 103). The identifying unit 21 which can confirm that the bus is under idle state requests the CPU 19 to transmit/receive such information which is used to identify the external appliance 13 between the CPU 14 and the own device (step 104).

Alternatively, the identification information by the CPU 19 may be acquired from the CPU 14 by utilizing the ATA standard, or other methods (step 105). As an example of the ATA standard, the CPU 19 issues a Set Feature command so as to transmit/receive the identification information between the CPU 14 and the own CPU 19 by employing the data bus. With respect to this Set Feature command defined by the ATA standard, a bit indicative of a commencement of transmitting/receiving the identification information is provided in either the vender unique region or the reserve region. While the CPU 14 monitors the issuing operation of the Set Feature command and the bit indicative of starting of the transmission/reception of the identification information, when the bit is equal to "1", this CPU 14 sends the identification information to the CPU 19. As one of the alternative methods, for example, while the data bus is used, the CPU 19 may write a predetermined value into the data bus. On the other hand, while the CPU 14 monitors the data bus, when the CPU 14 confirms that the predetermined value is written into the data bus, this CPU 14 may transmit the identification information to the CPU 19.

In FIG. 6, there is shown an example of identification information. Alternatively, an external electronic appliance may be added in addition to FIG. 6. The CPU 19 notifies a identification result to the discriminating means 21 (step 106). It is preferable that the acquisition of the identification information may be carried out just after the apparatus is initiated, after the apparatus is set, or just after the external electronic appliance is mounted.

The flag adding/removing unit 22 owns similar functions as those of both the flag adding unit 4 and the flag removing unit 12 of the first embodiment. In such a case that data is written into the information recording/reproducing unit 23, the identification result derived from the identifying unit 21 is added to a data stream, for instance, every a head of 8-bit data defined by the ATA standard, or every a preselected time interval. Also, in the case that data is read out from the information recording/reproducing unit 23, the flag information is removed from the data stream containing the flag information.

With employment of the above-explained arrangement, the sort of external electronic appliance can be judged/identified based upon the flag information. Also, a plurality of input data having the different standards, which are entered from a plurality of external electronic appliances, can be read/written from/into a single set of magnetic disk apparatus in the discriminatable manner with respect to each of the connected electronic appliances.

Figure 7:
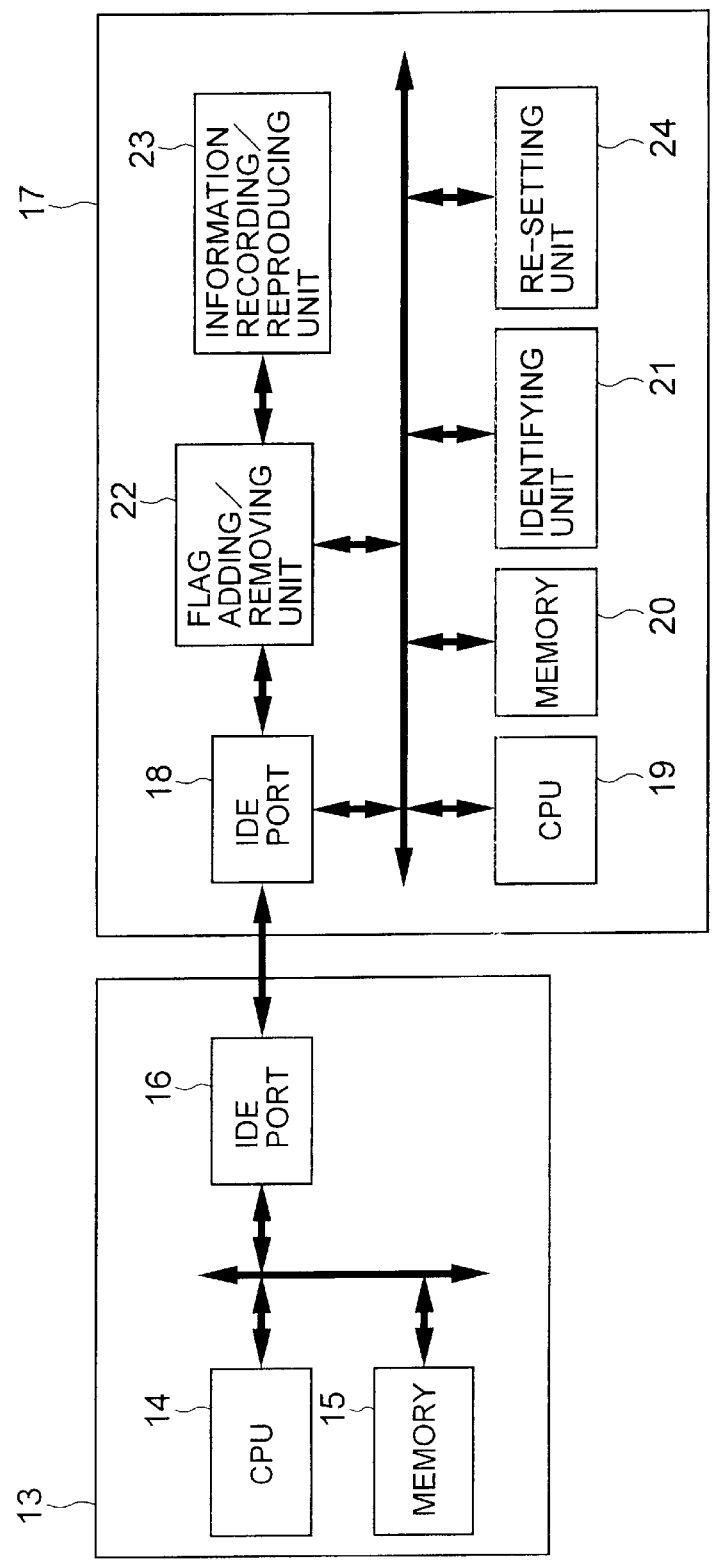
FIG. 7 is a block diagram of an information processing system according to a third embodiment of the present invention.

FIG. 7 is a schematic block diagram of an information processing system according to a third embodiment of the present invention. This third information processing system owns a different structure such that a re-setting unit 24 is provided within the magnetic disk apparatus 17.

The re-setting unit 24 is employed so as to re-set a value of specification information capable of determining performance of the information recording/reproducing unit 23 based upon either identification information derived from the identifying unit 21 or flag information derived from the flag adding/removing unit 22.

Figure 8:
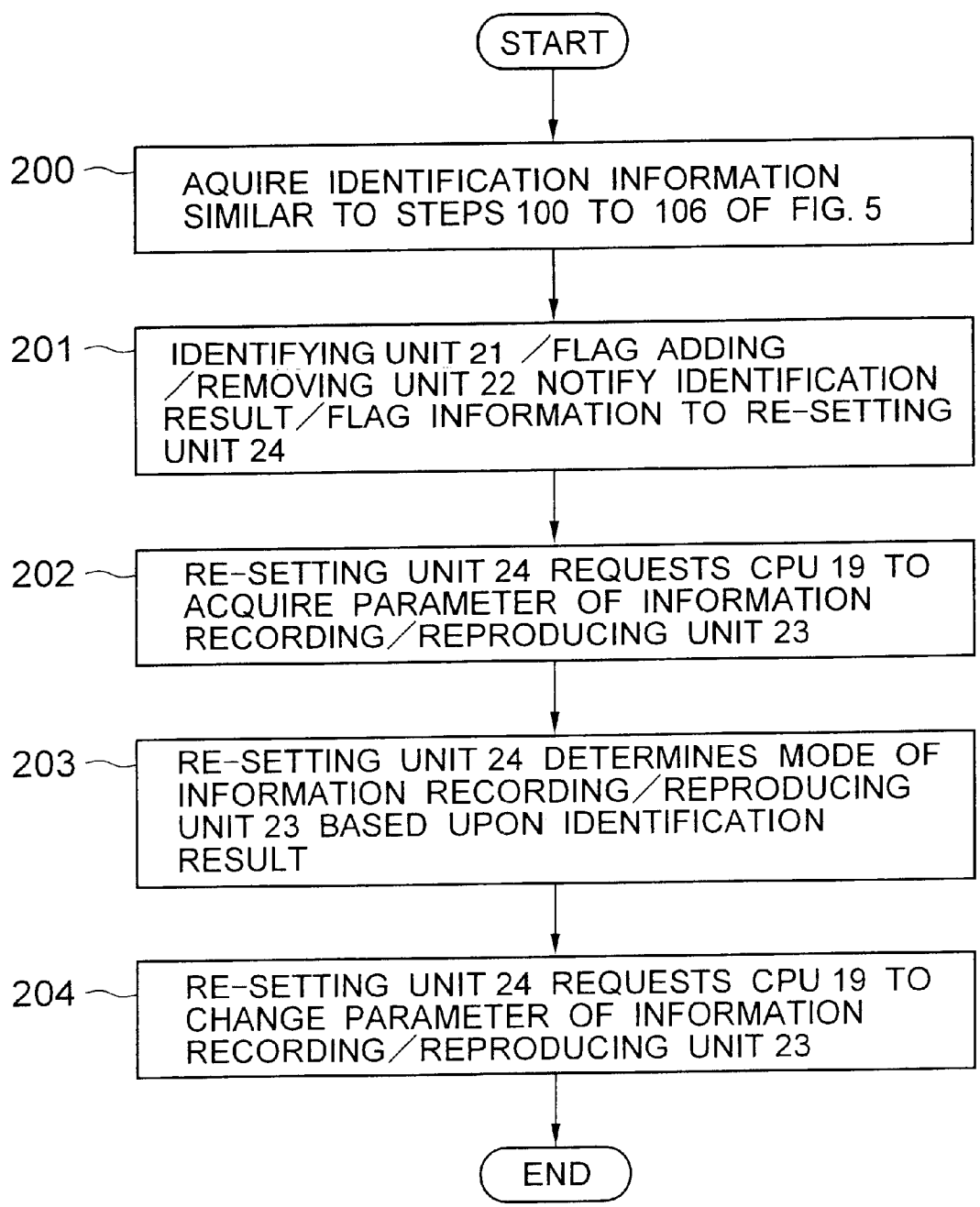
FIG. 8 is a flow chart for explaining a process operation of re-setting a performance parameter.

Referring now to a flow chart of FIG. 8, a sequential process operation of resetting operations will be explained. Just after the apparatus is initiated, after the apparatus is reset, and just after the external electronic appliance is mounted, either the identification information or the identification information of the flag information is acquired at the steps 100 to 500 of FIG. 5 (step 200). Just after the identification information has been acquired, both the identifying unit 21 and the flag adding/removing unit 22 notify the identification information to the re-setting unit 24 (step 201). The re-setting unit 24 which receives the identification information requests the CPU 19 to issue an Identify Device command in order to read out a performance parameter of the magnetic disk apparatus 23 (step 202). With respect to this Identify Device command defined by the ATA standard, both such information capable of indicating as to whether or not the information recording/reproducing unit 23 owns a re-setting function of the performance parameter, and a bit indicative of information as to each of the performance parameters are provided in, for example, either the bender unique region or the reserve region. After the information recording/reproducing unit 23 confirms that the Identify Device command is issued, this information recording/reproducing unit 23 transmits such a response issued in accordance with the standard of the Identify Device command to the CPU 19, into which the information of the respective performance parameters is added, and such information for indicating as to whether or not the own device can re-set the performance parameter is added. As a result, the performance parameters of the information recording/reproducing unit 23 can read. The read performance parameters may be preferably stored in the memory 20.

FIG. 9 represents an example of performance parameters of the information recording/reproducing unit 23. As to a seek mode, a selection is made of a high speed mode, and a low speed mode. In the high speed mode, a read/write head is transported (moved) in a high speed. In the low speed mode, the read/write head is moved in a low speed. A transfer speed indicates a data transfer speed between the external electronic appliance 13 and the magnetic disk apparatus 17, and a selection is made of any one of the three modes. A spindle rotation speed shows a rotation speed of a spindle motor which fixes a recording medium (not shown) of the information recording/reproducing unit 23, and a selection is made of any one of the three modes. A cache size shows a cache size of a RAM (not shown) of the information recording/reproducing unit 23, and a selection is made of any one of three modes. An ECC length indicates a length of error detecting/correcting code of data, and a selection is made of any one of four modes.

Once the re-setting unit 24 confirms that the information recording/reproducing unit 23 owns the re-setting function of the performance parameter as a result of issuing of the Identify Device command, this re-setting unit 24 determines an operation mode of the information recording/reproducing unit 23 based upon the identification information (step 203). FIG. 10 shows an example of operation modes.

In a high performance mode, while performance is handled as a major aspect, maximum values realizable by the apparatus are set to the respective performance parameters. In a low noise mode, in order to suppress noise sounds produced from the information recording/reproducing unit 23 as being permitted as possible, minimum necessary values which are required while an application program is executed are set to the respective performance parameters. In a moving picture reproduction mode, in order to handle a real-time transfer operation of data read from the information recording/reproducing unit 23 as a major aspect, values suitable for a rang required by the external electronic appliance 13 are set to the respective performance parameters.

In a highly reliable mode, in order to handle reliability of data as a major aspect, minimum values are set to the respective parameters. As one example of selections of the operation modes, when the external electronic appliance 13 corresponds to a personal computer, the high performance mode is set. When the external electronic appliance 13 corresponds to a music server, the low noise mode is set. When the external electronic appliance 13 corresponds to a video recorder, the moving picture reproducing mode is set. When the external electronic appliance 13 corresponds to a portable information terminal and a can navigation system, the high reliable mode is set.

FIG. 11 shows another example of the performance parameter of the magnetic disk apparatus 23. As a seek trajectory, either a high speed trajectory or a low noise trajectory may be selected. The high speed trajectory corresponds to, for example, a Bang-Bang control type saturation trajectory by which the read/write head can be moved in a high speed. The low noise trajectory corresponds to such a trajectory that a gain of a certain frequency range in a frequency spectrum of a trajectory is made low. The low noise trajectory can reduce sounds produced by the information recording/reproducing unit 23 during seek operation. As the seek method, either a direct seek method or an intermittent seek method may be selected. The direct seek method corresponds to such a seek method that the read/write head can be moved to a target track during only one seek operation, so that the read/write head can be moved in a high speed. The intermittent seek method corresponds to such a seek method that the read/write head is moved to a target track during plural seek operations, so that the power consumption can be suppressed to a low value. A servo gain corresponds to an open loop gain of a head positioning control system, and a selection is made of normal gain, a high gain, and a low gain. The high gain corresponds to such a gain that a gain of a servo range of an open loop, or a gain of a specific frequency range is increased with respect to the normal gain, so that resistivity with respect to the external shocks applied to the apparatus can be improved. The low gain corresponds to such a gain of a servo range of an open loop, or a gain of a specific frequency range is decreased with respect to the normal gain, so that stability such as phase margin and gain margin can be improved. A notch filter corresponds to a portion of a compensator of a head positioning control, and a selection is made of the notch filter under use, or the notch filter under non-use. When the notch filter is used, there are advantages in, for example, a high-order resonant mode compensation of a control object, and a vibration suppression of a specific frequency. When the notch filter is not used, there is a merit that the stability such as the phase margin and the gain margin can be improved.

The external sensor may be selectively operated in the use mode, or in the non-use mode. In the case that either the information recording/reproducing unit 23 or the external electronic appliance is equipped with, for example, a vibration sensor and/or an acceleration sensor, when the external sensor is used, the following merits can be achieved. That is, the external sensor detects that external shocks are applied to the apparatus, so that the data writing operation is stopped, namely, the data protection and the acceleration feedback compensation. As a result, the external disturbance following characteristic of the head positioning control system can be improved. When the external sensor is not used, since the software processing amount for the data protection is decreased, the performance of the apparatus can be improved.

FIG. 12 indicates an example of selections of the operation mode in the case that the performance parameter of FIG. 11 is employed. When the external electronic appliance 13 requires the high speed characteristic, there is a merit that as the seek trajectory, the high speed trajectory is selected, and as the seek method, the direct seek method is selected. In this case, a personal computer may be used as this external electronic appliance 13. When the external electronic appliance 13 requires the low noise characteristic, there is a merit that the low noise trajectory is selected. In this case, as the example of the external electronic appliance 13, since this appliance may be used in a home living room, a music server and a video server may be employed. When the external electronic appliance 13 request low power consumption, there are advantages that the low noise trajectory is selected as the seek trajectory, and the intermittent seek method is selected as the seek method. In this case, a portable information terminal may be used as the example of this external electronic appliance 13. In the case that the external electronic appliance 13 requires the anti-shock characteristic, there are merits that the high gain is selected as the servo gain, and the external sensor is used. In this case, a car navigation system may be used as this example of the external electronic appliance 13.

When the operation mode of the information recording/reproducing unit 23 is determined based upon the identification information, the re-setting unit 24 requests the CPU 19 to issue a Set Feature command in order to set the performance parameter of the information recording/reproducing unit 23 (step 204). With respect to this Set Feature command defined by the ATA standard, such an instruction capable of setting the performance parameter of the information recording/reproducing unit 23 is provided in, for example, the vender unique region, or the reserve region.

With employment of the above-explained arrangement, the magnetic disk apparatus can be driven in an optimum condition in correspondence with the external electronic appliance connected to the magnetic disk apparatus in addition to the effect of the second embodiment.

FIG. 13 is a block diagram for indicating a magnetic disk apparatus according to a fourth embodiment of the present invention. The magnetic disk apparatus according to this fourth embodiment is arranged by that a detecting unit 25, a processing unit 26, and a notifying unit 27 are added to the above-explained magnetic disk apparatus of the third embodiment.

The detecting unit 25 reads out information recorded on the information recording/reproducing unit 23, and detects a disk capacity, a file name, a file attribute, a directory structure, and the like. Then, the detecting unit 25 notifies the detected result to the processing unit 26. Also, the detecting unit 25 detects a head positioning error signal derived from the information recording/reproducing unit 23, and detects as to whether or not data read/write operation can be done.

Figure 14:
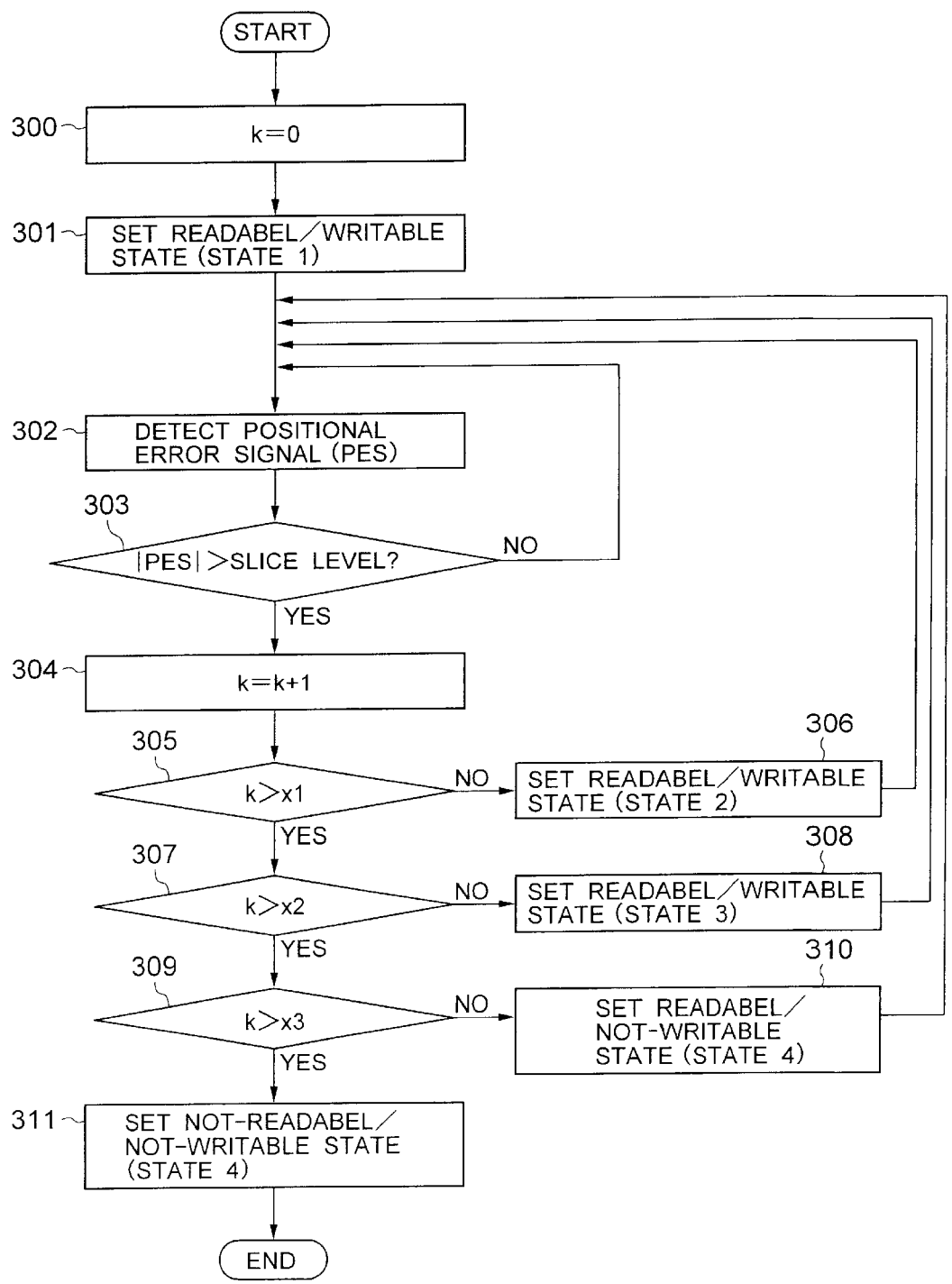
FIG. 14 is a flow chart for describing an example of a process operation capable of detecting a data readable/writable state.

Referring now to a flow chart of FIG. 14, a description will be made of an example of a detecting process operation as to whether or not data read/write operation is available. The detecting unit 25 counts a frequency degree at which the positional error signal exceeds a predetermined slice level, and then detects the following states in accordance with an increase in the count value, namely from a state under which both the read and write operations can be carried out, another state under which only the read operation can be done but the write operation cannot be done, and also another state under which both the read and write operations cannot be carried out. In view of the data protection, at such a time instant when only the data read operation is available but the data write operation is not available, the data is preferably backed up by another magnetic disk apparatus.

First, the counter is cleared (step 300), and a state 1 of the readable/writable operations is set as an initial condition (step 301). The detecting unit 25 detects the positional error signal (step 302), and performs such a comparison as to whether or not the positional error signal exceeds a predetermined slice level (step 303). When the detected positional error signal does not exceed this predetermined slice level, the detecting process operation is returned to the previous step 302. To the contrary, when the detected positional error signal exceeds the slice level, the detecting unit 25 increments the counter value by 1 (step 304). The detecting unit 25 executes such a comparison as to whether or not the count value exceeds a predetermined value "x1" (step 305). When the count value does not exceed the predetermined value "x1", the detecting unit 25 sets a state 2 of the readable/writable operations (step 306), and the detecting operation is returned to the previous step 302. To the contrary, when the count value exceeds the predetermined value "x1", the detecting operation is advanced to a step 306. The detecting unit 25 executes such a comparison as to whether or not the count value exceeds a predetermined value "x2" (step 307). When the count value does not exceed the predetermined value "x2", the detecting unit 25 sets a state 3 of the readable/writable operations (step 308), and the detecting operation is returned to the previous step 302. To the contrary, when the count value exceeds the predetermined value "x2", the detecting operation is advanced to a step 309. The detecting unit 25 executes such a comparison as to whether or not the count value exceeds a predetermined value "x3" (step 309). When the count value does not exceed the predetermined value "x3", the detecting unit 25 sets a state 4 of the readable/not writable operations (step 310), and the detecting operation is returned to the previous step 302. To the contrary, when the count value exceeds the predetermined value "x3", the detecting unit 25 sets as a state, a state 5 of the not readable/not writable operations (step 311). The detecting process operation of FIG. 14 may be carried out every tone a certain time period has passed by employing a timer and the like.

The detection result of the detecting unit 25 is sent to the processing unit 26 so as to be converted into various conditions of a numeral value, a figure, a color, and a sound, which are notified by a notifying unit 27 to the user. The notifying unit 27 is constituted by employing at least any one of a monitor, an indicator, a lamp, and a speaker. The processing unit 26 contains a graphic controller and the like, and converts the detection result of the detecting unit 25 into a condition suitable for the input to the notifying unit 27.

Figure 15:
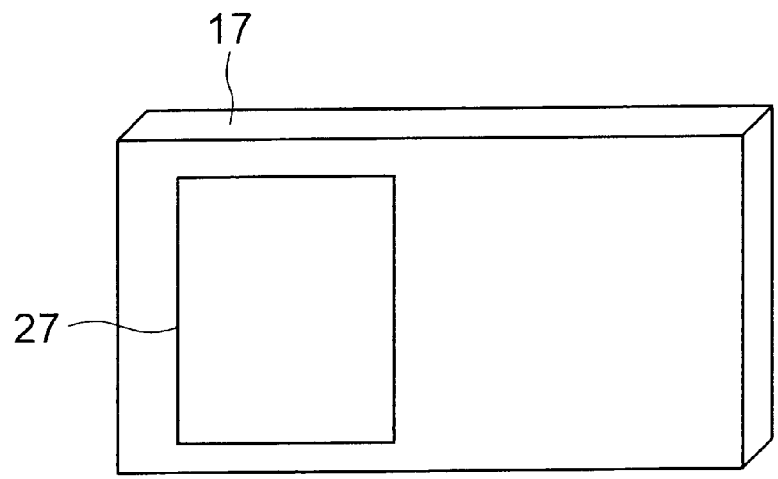
FIG. 15 represents an example of an outer appearance diagram of a magnetic disk apparatus.
Figure 16:
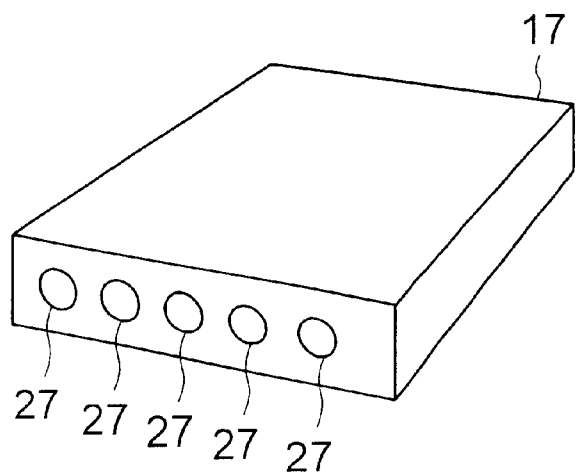
FIG. 16 shows an example of an outer apparatus diagram of a magnetic disk apparatus.

FIG. 15 represents an example of an outer appearance diagram of a magnetic disk apparatus 17 in the case that a monitor is employed as the notifying unit 27. This monitor of the magnetic disk apparatus 17 can display a disk capacity, a file name, a file attribute, a directory structure, and a read/write state in the forms of numeral value, figure, and color. FIG. 16 shows an example of an outer appearance diagram of a magnetic disk apparatus 17 in such a case that a lamp is employed as the notifying unit 27. In response to readable/writable states, in the case of the state 1, one set of green light located from a left side is turned ON; in the case of the state 2, two sets of green light located from the left side are turned ON; in the case of the state 3, three sets of green light located from the left side are turned ON; in the case of the state 4, three sets of green light are turned ON and also one set of yellow light is turned ON; and also in the case of the state 5, three sets of green light located from the left side are turned ON, and one set of yellow light, and further one set of red light are turned ON. Also, light may be turned ON in response to a disk capacity. Furthermore, when a speaker is additionally provided as this notifying unit 27, if the readable/writable states are brought into the states 4 and 5, these states may be notified to the user by way of sound.

With employment of the above-explained arrangement, in addition to the above-described effect of the third embodiment, the internal states of the information recording/reproducing unit, which contain the data attribute and the like written into the magnetic disk apparatus, can be detected and can be notified to the user. As a consequence, since the back-up timing of the data, the replace timing of the magnetic disk apparatus, and the disk remaining capacity can be notified tot he user, the user friendly magnetic disk apparatus can be provided and also reliability of the data protection can be improved. It should also be understood that a similar effect may be achieved by applying the detecting unit 25, the processing unit 26, and the notifying unit 27 to the magnetic disk apparatus of the first embodiment.

Figure 17:
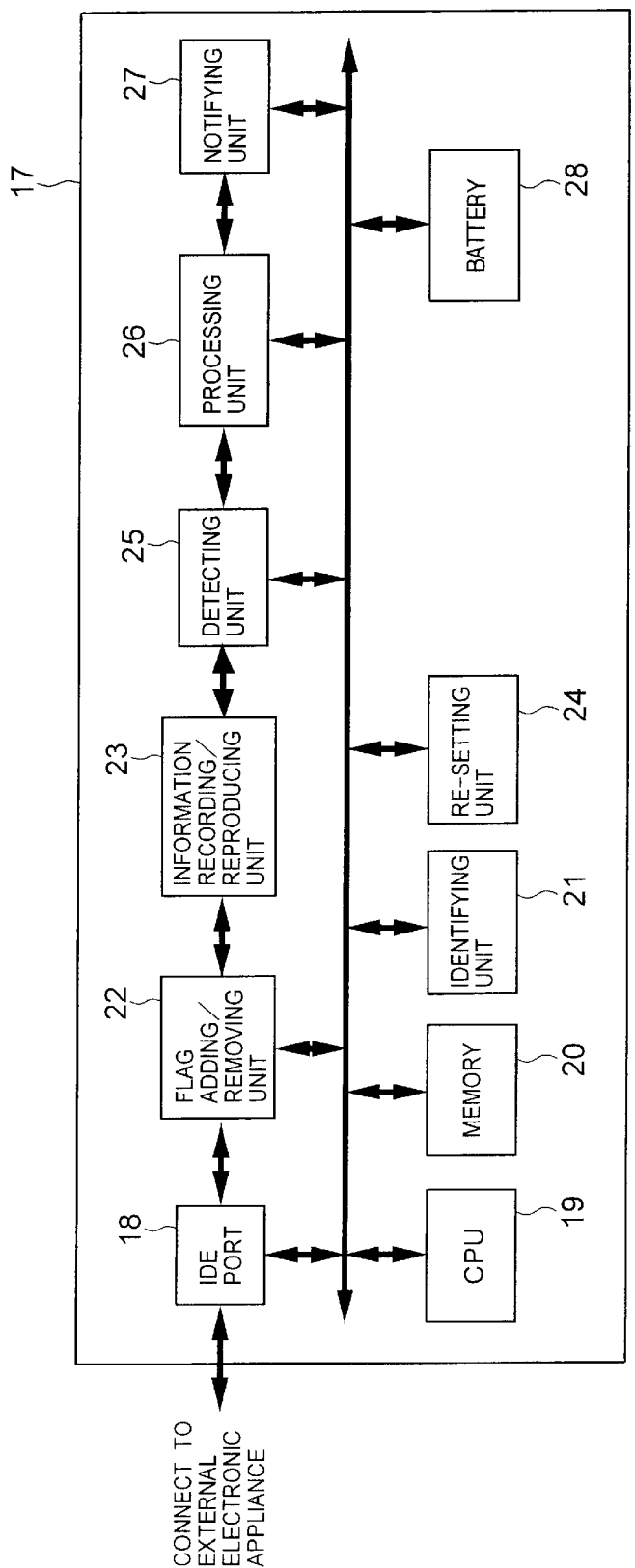
FIG. 17 is a block diagram for indicating a magnetic disk apparatus according to a fifth embodiment of the present invention.

FIG. 17 is a block diagram of a magnetic disk apparatus according to a fifth embodiment of the present invention. The magnetic disk apparatus of this fifth embodiment is realized by mounting a battery 28 on the magnetic disk apparatus of the fourth embodiment.

In this magnetic disk apparatus 17, when this magnetic disk apparatus 17 is connected to the external electronic appliance 13, the power supply voltage is applied thereto from the external electronic appliance 13. To the contrary, when the magnetic disk apparatus 17 is not connected to the external electronic appliance 13, the power supply voltage is applied from the battery 28.

With employment of the above-explained arrangement, even when no power supply voltage is applied from the external electronic appliance, since the magnetic disk apparatus can be driven by the battery, even the magnetic disk apparatus 17 itself may detect the internal states of the information recording/reproducing unit containing the attribute of the written data, and then may notify the detection result to the user.

As a consequence, even the magnetic disk apparatus itself can notify the disk remaining capacity and the file name to the user, so that the user friendly magnetic disk apparatus can be realized.

As previously described in detail, a plurality of external electronic appliances can be identified, which are mounted on the magnetic disk apparatus. Also, the disk apparatus can be driven in the optimum manner in accordance with a plurality of external electronic appliances mounted on this disk apparatus. Furthermore, since the data back-up timing, the replace timing of the apparatus, and the disk remaining capacity can be notified to the user, the user friendly magnetic disk apparatus can be provided and also reliability of the data protection can be improved. In addition, even when no power supply voltage is applied from the external electronic appliance, even such an information processing system itself can detect the internal conditions of the magnetic disk apparatus, which involve the attribute of the data written in the magnetic disk apparatus, and can notify the detected internal condition to the user, while this information processing system is driven by the battery.

What is claimed is:

1. A disk apparatus comprising:

a plurality of signal input terminals defined by different standards;

a data converter for converting a signal entered from said input terminals into input data;

an identifying unit for identifying a sort of said input signal;

a flag adding unit for adding a flag to the data outputted from said data converter based upon the output of said identifying unit;

a recording/reproducing head for recording/reproducing the signal to which said flag has been added; and a disk for recording thereon information.

2. A disk apparatus as claimed in claim 1 wherein:

said disk apparatus is further comprised of:

a plurality of signal output terminals defined by different standards;

a selecting unit for selecting a signal output terminal based upon a flag of data read from said disk;

a flag removing unit for removing a flag from the read data; and a data converter for converting the data from which the flag is removed to output the converted data to said signal output terminal.

3. A disk apparatus as claimed in claim 1 wherein:

said disk apparatus is further comprised;

a detecting unit for detecting an internal condition of said disk apparatus;

a processing unit for processing the output of said detecting unit; and a notifying unit for converting the internal condition of said disk apparatus into at least one state of a numeral value, a figure, a color, and a sound in combination with the output of said processing unit, and for notifying the converted internal condition to a user.

4. An information processing system wherein:

a disk apparatus equipped with a recording/reproducing unit for recording/reproducing information is comprised of:

a plurality of input terminals provided in correspondence with a sort of an information processing apparatus;

a plurality of output terminals;

an identifying unit for identifying the sort of the information processing apparatus based upon a signal entered from the input terminal and a flag which is applied to a reproduced signal of said recording/reproducing unit;

a flag adding unit for adding a flag to said input signal in response to the sort of the identified information processing apparatus; and a flag removing unit for recording the signal to which the flag is added on the information recording/reproducing unit, and for removing the flag from said identified reproduction signal; and wherein:

the signal from which the flag is removed is transmitted via a desirable output terminal to the information processing apparatus based upon the identification result of said identifying unit.

5. An information processing system as claimed in claim 4 wherein:

said information processing system is further comprised of:

means for requesting the disk apparatus to set a value of specification information capable of determining performance of said disk apparatus in combination with said identification result, or said flag information; and means for causing the disk apparatus which receives the request to re-set an own specification.

6. An information processing system as claimed in claim 4 wherein:

said information processing system is further comprised of:

a detecting unit for detecting an internal condition of said disk apparatus;

a processing unit for processing the output of said detecting unit; and a notifying unit for converting the internal condition of said disk apparatus into at least one state of a numeral value, a figure, a color, and a sound in combination with the output of said processing unit, and for notifying the converted internal condition to a user.

7. A disk apparatus comprising:

an input/output terminal for transmitting/receiving information used to identify an information processing device mounted on the disk apparatus;

an identifying unit for identifying an information processing device based upon said identification information;

a flag adding/removing unit for requesting the disk apparatus to re-set a value of specification information capable of determining performance of said disk apparatus in combination with the identification information of said identifying unit; and a re-setting unit for causing said disk apparatus which receives the request to re-set an own specification.

8. A disk apparatus comprising:

a detecting unit for detecting an internal condition of said disk apparatus;

a processing unit for processing the output of said detecting unit; and a notifying unit for converting the internal condition of said disk apparatus into at least one state of a numeral value, a figure, a color, and a sound in combination with the output of said processing unit, and for notifying the converted internal condition to a user, wherein the internal condition comprises recorded information, the disk apparatus operable both while connected to an external device and while not connected to an external device.

9. A disk apparatus as claimed in claim 8 wherein:

a battery is mounted inside said disk apparatus, the battery providing power to the disk apparatus when the disk apparatus is not connected to an external device; and said detecting unit detects an electric power amount of the battery, and transmits the detection result as one of internal information to said processing unit.

10. The disk apparatus according to claim 8, wherein the internal condition comprises at least one of disk size, file name, file attribute, directory configuration, disk read capability, and disk write capability.

11. The disk apparatus according to claim 8, wherein the internal condition includes one of both a read and a write can be performed, a read can be performed but a write cannot be performed, and both a read and a write cannot be performed.

12. The disk apparatus according to claim 8, wherein data backup is performed when the detecting unit detects and internal condition comprising a read can be performed but a write cannot be performed.

* * * * *